United States Patent [19]
Jaeger et al.

[11] Patent Number: 6,075,089
[45] Date of Patent: Jun. 13, 2000

[54] PROCESS FOR PRODUCING DISPERSIONS OF WATER-SOLUBLE VINYL POLYMERS AND STABILIZER FOR CARRYING OUT THE PROCESS

[75] Inventors: Werner Jaeger, Kleinmachnow; Arvid Zimmermann, Berlin; Mathias Hahn, Wilhelmshorst; Volker Hildebrandt, Mannheim; Karl Heinz Reichert, Berlin, all of Germany

[73] Assignee: Fraunhofer-Gesellschaft zur Foerderung der Angewandten Forschung E.V.

[21] Appl. No.: 09/125,181

[22] PCT Filed: Feb. 10, 1997

[86] PCT No.: PCT/DE97/00288

§ 371 Date: Oct. 5, 1998

§ 102(e) Date: Oct. 5, 1998

[87] PCT Pub. No.: WO97/30094

PCT Pub. Date: Aug. 21, 1997

[30] Foreign Application Priority Data

Feb. 13, 1996 [DE] Germany ............ 196 06 899

[51] Int. Cl.$^7$ ............ C08K 5/06; C08L 39/00; C08F 2/16

[52] U.S. Cl. .......... 524/762; 524/458; 524/504; 524/555; 524/759; 524/760; 524/815

[58] Field of Search ............ 524/762, 759, 524/760, 815, 458, 504, 555; 525/69; 526/201

[56] References Cited

U.S. PATENT DOCUMENTS

| | | |
|---|---|---|
| 4,380,600 | 4/1983 | Hosoda et al. . |
| 4,975,524 | 12/1990 | Berendt . |
| 5,028,237 | 7/1991 | Berendt . |
| 5,219,900 | 6/1993 | Davies et al. . |
| 5,541,252 | 7/1996 | Schmitt et al. ............ 524/815 |
| 5,597,858 | 1/1997 | Ramesh et al. ............ 524/815 |
| 5,760,154 | 6/1998 | Kraus et al. . |

FOREIGN PATENT DOCUMENTS

| | | |
|---|---|---|
| 0 363 319 A1 | 4/1990 | European Pat. Off. . |
| 29 24 663 | 12/1979 | Germany . |
| 43 43 993 A1 | 6/1995 | Germany . |
| 195 21 096 A1 | 12/1996 | Germany . |
| 2 206 591 | 1/1989 | United Kingdom . |

*Primary Examiner*—Tae Yoon
*Attorney, Agent, or Firm*—Marshall & Melhorn

[57] ABSTRACT

The present invention concerns a process for producing dispersions of water-soluble vinyl polymers and a stabilizer for carrying out this process. Such water-soluble, particularly cationic vinyl polymers, are employed on a large scale as process expediters for carrying out, for instance, separating processes in water treatment or waste-water purification, respectively, in the paper, coal and ore industries, in oil production or also in the food stuff industry, among others, for floculation, coagulation, retention or dewatering. According to the present invention, water-soluble vinyl polymers are homo- or copolymerized in the presence of a dispersion stabilizer of the invention. The stabilizer consists of a graft copolymer whose backbone is formed by polyethylene oxide and its grafted branches of cationic vinyl monomers. Among others, cationic, hydrophobically modified vinyl monomers can be advantageously employed. Copolymerizations can be carried out between cationic or non-ionic hydrophobically modified vinyl polymers and cationic or non-ionic, non-hydrophobically modified vinyl polymers.

29 Claims, No Drawings

PROCESS FOR PRODUCING DISPERSIONS OF WATER-SOLUBLE VINYL POLYMERS AND STABILIZER FOR CARRYING OUT THE PROCESS

The present invention relates to a method of manufacturing water-soluble vinyl polymers and to a stabiliser for carrying out this method.

BACKGROUND OF THE INVENTION

1. Field of the Invention

Water-soluble, particularly cationic vinyl polymers are employed on a large scale as process expediters for carrying out for instance separating processes in water treatment or waste water purification, respectively, in the paper, coal and ore industries, in oil production or also in the foodstuffs industry. They serve among other things for flocculation, coagulation, retention or de-watering. Despite the usually small quantities used, these water-soluble vinyl polymers often have an importance which is determining in technology.

Manufacture of these polymers according to prior art is carried out by radical homo- or copolymerisation in a homogenous or heterogeneous phase. The homogenous solution polymerisation in water has the disadvantage that even at polymer contents of below 10% by mass, high-viscosity systems are present, which do not permit a further increase in the content of the active ingredient. The low polymer content caused by this in the final product leads to poor space-time yields of the synthesis and to increased transport costs in transport of the products to the user.

Polymerisations in the heterogeneous phase, such for example as the inverse emulsion polymerisation in organic solvents as a carrier phase, give rise in part to considerably higher contents of solid matter. However they have the disadvantage that operation with solvents requires special protective measures and in application of the products, all the solvent is released to the environment. The inverse suspension polymerisation in hydrophobic combustible solvents as a carrier phase in fact after isolation and drying of the polymers leads to pulverulent products; the multi-stage process however is cost intensive and requires much energy.

2. Description of the Related Art

Due to the disadvantages of a polymerisation in the heterogeneous phase with organic solvents, the manufacture of dispersions of water-soluble polymers was therefore proposed, omitting organic solvents as carrier phase. The documents CA 2 096 472 and U.S. Pat. No. 5,403,883 describe the polymerisation of a combination of water-soluble and hydrophobic vinyl monomers, if necessary in combination with an amphiphatic monomer, in the presence of a polyalkylenether or of a polyelectrolyte, which is incompatible with the polymer to be dispersed, and has molecular weights of $<5 \times 10^5$ g/mol. The polyalklylenether or the polyeletrolyte serves in this case as a dispersion stabiliser. Preferably, poly(diallyldimethylammonium chloride) is used. The resultant dispersed polymer has molar masses of at least $10^6$ g/mol. A disadvantage in the methods disclosed in CA 2 096 472 and U.S. Pat. No. 5,403,883 is that considerable quantities of dispersion stabilisers, even up to 80% by mass with respect to the totality of monomers used, are brought into play. Furthermore, during the polymerisation, viscosity maxima can occur, so that the viscosity of the polymerising system under certain circumstances is greater than the viscosity of the polymerised end product.

The document EP 0 183 466 describes the polymerisation of water-soluble monomers in aqueous solutions of inorganic salts in the presence of polyols with molecular weights of up to 600 g/mol and/or polyelectrolytes which have been obtained by homopolymerisation of ionic vinyl monomers or their statistical copolymerisation, as dispersion stabilisers.

The document U.S. Pat. No. 4,380,600 describes the copolymerisation of water-soluble and water-insoluble vinyl monomers to form water-soluble copolymers in aqueous solutions of inorganic salts or with addition of the salt after termination of the reaction. There are used as dispersion stabilisers water-soluble polymers with molar masses between 300 and 10000000 g/mol, which preferably contain in their structural unit an ether, hydroyl or carboxyl group, for example polyethylene glycol, polyethylene oxide or polyvinyl alcohol.

A disadvantage in the methods described in EP 0 183 466 and U.S. Pat. No. 4,380,600 is in particular that the viscosity of the resultant dispersions is comparatively high. A further particular disadvantage is that during the polymerisation viscosity maxima are passed through, which lie in the range of the viscosity during previous solution polymerisation, and therefore render the process difficult.

A disadvantage in all the methods here named in prior art is that the resultant dispersions coagulate after a relatively short time, and therefore the capacity for storage is restricted.

SUMMARY OF THE INVENTION

The object of the present invention is to make available a simple synthesis method for manufacturing dispersions of water-soluble vinyl polymers, in particular attempts being made to obtain dispersions stable over a long period with a low viscosity both of the polymerising system and of the polymerised end product of the dispersion. It is a further object of the present invention to make available a stabiliser, by means of which dispersions of water-soluble vinyl polymers can be produced with the named properties.

This object is achieved by the method according to the invention and the stabiliser according to the invention as per the preambles in conjunction with the characterising features of claims 1 or 27.

By means of the radical homo- or copolymerisation of water-soluble vinyl polymers in an aqueous solution of salts, to which a stabiliser according to the invention has been added, dispersions are produced which have a low viscosity both of the polymerising and of the polymerised system, and which have outstanding long-term stability. Even after lengthy storage for example sediments can be re-dispersed by simple shaking. The stabiliser according to the invention consists of a graft copolymer, whose backbone is formed from polyethylene oxide and whose grafted branches are formed from cationic vinyl monomers.

An advantage in the method according to the invention is that in comparison to prior art a reduced quantity of stabiliser is required and at the same time the final product has a high polymer content, i.e. a high final yield. In this way the space-time yield of the polymerisation is extremely high. Further advantages of the method according to the invention reside in the fact that the polymerisation proceeds even up to high yields with a uniform speed. By means of the high polymer content in the final product there are furthermore caused only low transport costs for the user with respect to the mass of the vinyl polymer to be transported.

Advantageous further developments of the method according to the invention and of the stabiliser according to the invention will become apparent from the dependent claims.

DESCRIPTION OF THE PREFERRED EMBODIMENTS

Advantageously, graft copolymers can be used as stabilisers, whose grafted branches consist of the monomers diallyldimethylammonium chloride, vinyl pyridium halogenide and/or N-vinylimidazolium halogenide. Furthermore, graft copolymers are particularly suitable as stabilisers, when their grafted branches are formed from monomers of the general formula $$R_1-C(=CH_2)-CO-D-E-N^+(R_2,R_3,R_4)X^-$$

in which $R_1$ is hydrogen or a methyl residue,
$R_2$ is an alkyl residue with 1 to 2 carbon atoms,
$R_3$ is an alkyl residue with 1 to 2 carbon atoms,
$R_4$ is an alkyl residue with 1–6 carbon atoms or a benzyl residue,
D is the groupings NH or O,
E is an alkylene residue or hydroxyalkylene residue with 2 to 6 carbon atoms and
X is a halogenide, acetate or methosulphate.

In particular there may be used as a stabiliser graft copolymers whose grafted branches have a molar mass between 1000 and 3000000 g/l and/or whose polyethylene oxide polymer backbone has a molar mass between 2000 and 2000000 g/mol.

In at least one embodiment of the present invention, the radical initiator is added in a quantity between $10^{-3}$ and 2% by mass with respect to the overall reaction mix.

In at least one embodiment of the present invention, there are used as inorganic salts for the aqueous salt solution sodium chloride, sodium sulphate, ammonium chloride, ammonium sulphate, ammonium carbonate, sodium dihydrogen phosphate, and/or disodium hydrogen phosphate.

In at least one embodiment of the present invention, the low-molecular weight polymeric ammonium salts have a molar mass of less than 8000 g/mol.

In at least one embodiment of the present invention, used as the low-molecular ammonium salt is poly(dimethyldiallylammonium chloride).

In at least one embodiment of the present invention, the salts are used in quantities greater than 5% by mass with respect to the overall mass of the reaction mixture.

In at least one embodiment of the present invention, the salts are used in quantity greater than 7% by mass with respect to the overall mass of the reaction mixture.

In at least one embodiment of the present invention, the polymerisation is carried out under protective gas.

In at least one embodiment of the present invention the polymerisation of the vinyl monomers is carried out at a temperature between 30 and 80° C.

In at least one embodiment of the present invention, the polymerisation of the vinyl monomers is carried out at a temperature between 40 and 60° C.

A particularly advantageous configuration of the polymerisation and particularly advantageous properties of the dispersion obtained are achieved if cationic, hydrophobically modified vinyl monomers are homo-polymerised or cationic, hydrophobically modified and/or non-ionic, hydrophobically modified vinyl monomers are copolymerised with cationic and/or non-ionic vinyl comonomers. Particularly advantageous in this respect is the copolymerisation of hydrophobically modified vinyl polymers with non-hydrophobically modified vinyl comonomers. In this case it is sufficient to use only small quantities of the cost-intensive hydrophobically modified vinyl monomers, so that, compared to the homopolymerisation of only hydrophobically modified vinyl monomers, cost advantages are obtained.

For the copolymerisation, there are particularly suitable as non-ionic, hydrophobically modified vinyl monomers, monomers which have at least partly the general formula $$CH_2=C(R_1)-CO-A-R_2$$

in which $R_1$ is hydrogen or methyl residue
$R_2$ is an alkyl residue with 1 to 10 carbon atoms and
A is the groupings NH or O.

The cationic vinyl comonomers more advantageously have at least partly the general formula $$R_1-C(=CH_2)-CO-A-B-N^+(R_2,R_3,R_4)X^-$$

in which $R_1$ is hydrogen or a methyl residue,
$R_2$ is an alkyl residue with 1 to 6 carbon atoms,
$R_3$ is an alkyl residue with 1 to 6 carbon atoms,
$R_4$ is an alkyl residue with 1–6 carbon atoms or benzyl residue,
A is the groupings NH or O,
B is an alkylene residue or hydroxyalkylene residue with 2 to 6 carbon atoms and
X is a halogenide, acetate or methosulphate.

Among these cationic vinyl comonomers there are advantageous, among other reasons on grounds of cost, monomers in which $R_2$ is a methyl or ethyl residue,
$R_3$ is a methyl or ethyl residue,
$R_4$ is a methyl or ethyl residue,
B is an alkylene residue or hydroxyalkylene residue with 2 to 4 carbon atoms and
X is a halogenide or methosulphate.

The cationic vinyl comonomers can also consist at least partly of diallyldimethylammonium chloride, vinylimidazolium halogenide or vinylpyridinium halogenide.

There are suitable as non-ionic vinyl comonomers, monomers which consist at least partly of N-methyl-N-vinyl acetamide and/or of monomers of the general formula $$CH_2=C(R_1)-CO-N-(R_2,R_3)$$

in which $R_1$ is hydrogen or a methyl residue,
$R_2$ is hydrogen, an alkyl residue or a hydroxyalkyl residue with 1 to 4 carbon atoms and
$R_3$ is hydrogen, an alkyl residue or a hydroxyalkyl residue with 1 to 4 carbon atoms.

The method is further simplified in that the graft copolymers of the dispersion stabiliser can be generated during polymerisation of the water-soluble vinyl monomers, according to which, by interaction of radicals, radical structures have been formed on the backbone chain of the graft copolymers. In this way a separate method step is eliminated, and the entire method is simplified. The graft copolymers can be easily produced in the presence of a cationic vinyl monomer by conversion of polyethylene oxide with potassium peroxidisulphate.

There are suitable as salts for the aqueous salt solution in particular inorganic salts and/or low-molecular polymeric ammonium salts, or their mixtures.

In the following some embodiments given by way of example of the method according to the invention and of the stabilisers according to the invention will be described.

EXAMPLE 1

Synthesis of the Dispersion Stabiliser

A thermostatised double-jacket reactor with regulated internal temperature, with a stirring mechanism, a back-flow cooler, temperature sensor and gas introduction device is filled with 30 g of an 80% aqueous solution of methylacryloyloxyethyltrimethyl ammonium chloride, 30 g polyethylene oxide (molecular weight at will between 2000 and 2000000 g/mol) and 270 g water. Then the apparatus is flushed with nitrogen for an hour with continuous stirring and thereafter heat treated to 50° C. Thereafter 50 ml of the solution are removed, cooled to room temperature, 4 g of potassium peroxidisulphate suspended therein by stirring, and then passed back into the reactor. Then the reaction mixture is poured on ice and freed of low molecular electrolytes by ultra-filtration (membrane exclusion limit 10000 Dalton). The solvent is removed by freeze drying. After extraction with acetone, the graft copolymer remains. The ratio of polyether unit to cationic units lies at 2.5:1.

EXAMPLE 2

In a reactor as in Example 1, 26.5 g of a 75% aqueous solution of methacryloyloxethyldimethylbenzyl ammonium chloride, 17.7 sodium chloride, 1.5 g of the dispersion stabiliser from Example 1 and 68.6 g of de-ionised water are added. Then the apparatus is flushed with nitrogen for an hour with continuous stirring, and thereafter heated to 50° C. Thereafter the solution of 0.271 g 2,2' azobis (2-amidinopropane) hydrochloride is added in 5 ml of water. The mixture is kept at 50° C. for a further 60 minutes with continuous stirring. The final conversion comes to 99%, the dispersion has a viscosity of 20 mPas. The molar mass of the polymer comes to $2 \times 10^6$ g/mol.

EXAMPLE 3

With a procedure identical to Example 2, 130.4 g methacryloyloxethyldimethylbenzyl ammonium chloride, 76 g acrylamide, 159 g sodium chloride, 29 g of the stabiliser from Example 1, 794 g water and 2.44 g of the azoinitiator are used.

The reaction is terminated after 60 minutes. The final yield is 98%, the viscosity of the resultant dispersion comes to 24 mpas.

EXAMPLE 4

With a procedure identical to Example 2, 145.1 g of the solution of methacryloyloxethyldimethylbenzyl ammonium chloride, 88.9 g sodium chloride, 24.1 g polyethylene oxide (molecular weight 160 g/mol) and 575.5 g water are used. After addition of 0.61 g of the azoinitiator, dissolved in 10 ml water, the homopolymerisation of the cationic monomer and the graft copolymerisation of the cationic monomer occur in parallel on the polyethylene oxide backbone chain. After 100 minutes the reaction is terminated. The final yield is 99%, the molar mass of the polymer comes to $8 \times 10^6$ g/mol. The viscosity of the resultant dispersion is 40 mPas.

EXAMPLE 5

With a procedure identical to Example 4, 171.5 g methacryloyloxethyldimethylbenzyl ammonium chloride, solution, 80.6 g sodium chloride, 32.7 g polyethylene oxide (molecular weight 35000 g/mol), 532.4 g water and 0.52 g azoinitiator are used.

Duration of the reaction 110 minutes. The final yield is 99%, the molar mass of the polymer comes to $3.2 \times 10^6$ g/mol. The viscosity of the dispersion is 40 mPas.

EXAMPLE 6

With a procedure identical to Example 4, 128.5 g methacryloyloxyethyldimethylbenzyl ammonium chloride solution, 23.9 g acrylamide, 105.8 g sodium chloride, 27.1 g polyethylene oxide (molecular weight 100000 g/mol), 556.8 g water and 0.47 g azoinitiator are used. After 90 minutes, the conversion is 99%, and the viscosity of the dispersion is 25 mpas.

What is claimed is:

1. Method for manufacturing dispersions of water-soluble vinyl polymers, comprising the step of polymerizing an aqueous solution of salts, a stabiliser, water-soluble vinyl monomers and an initiator, wherein the water soluble vinyl monomers are radically homo- and/or copolymerised in this salt solution, characterised in that the stabiliser consists of a graft copolymer, the backbone of which is formed from polyethylene oxide and the grafted branches of which are formed from cationic vinyl monomers.

2. Method according to claim 1, characterised in that cationic hydrophobically modified vinyl monomers are homopolymerised as water-soluble vinyl monomers.

3. Method according to claim 1, characterised in that cationic hydrophobically modified and/or non-ionic hydrophobically modified vinyl monomers are copolymerised with cationic and/or non-ionic vinyl comonomers as water-soluble vinyl monomers.

4. Method according to claim 1, characterised in that the graft copolymers are generated by conversion of polyethylene oxide with potassium peroxidisulphate in the presence of a cationic vinyl monomer.

5. Method according to claim 1, characterised in that a stabiliser is used whose grafted branches are formed from the monomers diallyldimethylammonium chloride, vinylpyridiumhalogenide, N-vinylimidazolium halogenide and/or from monomers of the general formula

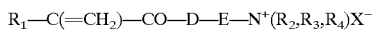

in which

R$_1$ is hydrogen or a methyl residue,

R$_2$ is an alkyl residue with 1 to 2 carbon atoms,

R$_3$ is an alkyl residue with 1 to 2 carbon atoms,

R$_4$ is an alkyl residue with 1–6 carbon atoms or a benzyl residue,

D is the groupings NH or O,

E is an alkylene residue or hydroxyalkylene residue with 2 to 6 carbon atoms and X is a halogenide, acetate or methosulphate.

6. Method according to claim 1, characterised in that a stabiliser is used whose grafted branches have a molar mass between 1000 and 3000000 g/mol.

7. Method according to claim 1, characterised in that a stabiliser is used whose polyethylene oxide polymer backbone has a molar mass between 2000 and 2000000 g/mol.

8. Method according to claim 1, characterised in that the stabiliser is used in quantities of 1 to 10% by mass relative to the mass of the water-soluble vinyl monomers to be polymerised.

9. Method according to claim 1, characterised in that the graft copolymers are generated by graft polymerisation during polymerisation of the water-soluble vinyl monomers.

10. Method according to claim 1, characterised in that a 2,2'-azobis-(2-amidinpropane) hydrochloride is added as a water-soluble initiator.

11. Method according to claim 1, characterised in that the radical initiator is added in a quantity between $10^{-3}$ and 2% by mass with respect to the overall reaction mix.

12. Method according to claim 3, characterised in that the non-ionic, hydrophobically modified vinyl monomers have at least partly the general formula $$CH_2=C(R_1)-CO-A-R_2$$

in which

R$_1$ is hydrogen or a methyl residue,

R$_2$ is an alkyl residue with 1 to 10 carbon atoms and

A is the groupings NH or O.

13. Method according to claim 3, characterised in that the cationic vinyl comonomers have at least partly the general formula $$R_1-C(=CH_2)-CO-A-B-N^+(R_2,R_3,R_4)X^-$$

in which

R$_1$ is hydrogen or a methyl residue,

R$_2$ is an alkyl residue with 1 to 6 carbon atoms,

R$_3$ is an alkyl residue with 1 to 6 carbon atoms,

R$_4$ is an alkyl residue with 1–6 carbon atoms or benzyl residue,

A is the groupings NH or O,

B is an alkylene residue or hydroxyalkylene residue with 2 to 6 carbon atoms and X is a halogenide, acetate or methosulphate.

14. Method according to claim 13, characterised in that in the general formula for the cationic vinyl comonomers, R$_2$ is a methyl or ethyl residue, R$_3$ is a methyl or ethyl residue, R$_4$ is a methyl or ethyl residue, B is an alkylene residue or hydroxyalkylene residue with 2 to 4 carbon atoms and X is a halogenide or methosulphate.

15. Method according to claim 3, characterised in that at least a portion of the cationic vinyl comonomers comprises diallyldimetlhylammonoium chloride, vinylimidazolium halogenide, and/or vinylpyridinium halogenide.

16. Method according to claim 3, characterised in that at least a portion of the non-ionic vinyl comonomers comprises N-methyl-N-vinyl acetamide and/or of monomers of the general formula $$CH_2=C(R_1)-CO-N-(R_2,R_3)$$

in which

R$_1$ is hydrogen or a methyl residue,

R$_2$ is hydrogen, an alkyl residue or a hydroxyalkyl residue with 1 to 4 carbon atoms and R$_3$ is hydrogen, an alkyl residue or a hydroxyalkyl residue with 1 to 4 carbon atoms.

17. Method according to claim 1, characterised in that there are used as salts for the aqueous salt solution inorganic salts and/or low-molecular polymeric ammonium salts and/or mixtures thereof.

18. Method according to claim 17, characterised in that there are used as inorganic salts for the aqueous salt solution sodium chloride, sodium sulphate, ammonium chloride, ammonium sulphate, ammonium carbonate, sodium dihydrogen sulphate, and/or disodium hydrogen phosphate.

19. Method according to claim 17, characterised in that the low-molecular polymeric ammonium salts have a molar mass of less than 80000 g/mol.

20. Method according to claim 17, characterised in that there are used as low-molecular ammonium salt poly (dimethyldiallylammonium chloride).

21. Method according to claim 17, characterised in that the salts are used in quantities greater than 5% by mass with respect to the overall mass of the reaction mixture.

22. Method according to claim 17 characterised in that the salts are used in quantities greater than 7% by mass with respect to the overall mass of the reaction mixture.

23. Method according to claim 1, characterised in that the polymerisation is carried out under protective gas.

24. Method according to claim 1, characterised in that the polymerisation of the vinyl monomers is carried out at a temperature between 30 and 80° C.

25. Method according to claim 24, characterised in that the polymerisation of the vinyl monomers is carried out at a temperature between 40 and 60° C.

26. A stabiliser for carrying out the method of claim 1, characterised in that it consists of a graft copolymer, whose backbone is formed from polyethylene oxide, and whose grafted branches are formed from cationic vinyl monomers.

27. A stabilizer according to claim 26, characterised in that the grafted branches are formed from the monomers diallyldimethylamionium chloride, vinylpyridium halogenide, N-vinylimidazolium halogenide and/or of monomers of the general formula $$R_1-C(=CH_2)-CO-D-E-N^+(R_2,R_3,R_4)X^-$$

in which

R$_1$ is hydrogen or a methyl residue,

R$_2$ is an alkyl residue with 1 to 2 carbon atoms,

R$_3$ is an alkyl residue with 1 to 2 carbon atoms,

R$_4$ is an alkyl residue with 1–6 carbon atoms or a benzyl residue,

D is the groupings NH or O,

E is an alkylene residue or hydroxyalkylene residue with 2 to 6 carbon atoms and X is a halogenide, acetate oder methosulphate.

28. A stabiliser according to claim 26, characterised in that the grafted branches have a molar mass between 1000 and 3000000 g/mol.

29. A stabiliser according to claim 26, characterised in that the polyethylene oxide-polymer backbone has a molar mass between 2000 and 2000000 g/mol.

* * * * *